US 6,700,345 B2

(12) United States Patent
Wilkens (10) Patent No.: US 6,700,345 B2
(45) Date of Patent: Mar. 2, 2004

(54) POSITION SENSOR AND ACTUATING SYSTEM (75) Inventor: Dean Wilkens, Scottsdale, AZ (US)

(73) Assignee: Honeywell Inc., Morristown, NJ (US)

( * ) Notice: Subject to any disclaimer, the term of this patent is extended or adjusted under 35 U.S.C. 154(b) by 150 days.

(21) Appl. No.: 10/032,637

(22) Filed: Nov. 9, 2001

(65) Prior Publication Data

US 2003/0090228 A1 May 15, 2003

(51) Int. Cl.$^7$ ................................................. G05G 5/05
(52) U.S. Cl. ...................................... 318/626; 318/565
(58) Field of Search ................................ 318/560, 565, 318/626, 671

(56) References Cited

U.S. PATENT DOCUMENTS

| | | | |
|---|---|---|---|
| 3,567,092 A | * | 3/1971 | Heinin et al. |
| 3,908,935 A | * | 9/1975 | Heintz |
| 3,924,167 A | | 12/1975 | Clark et al. |
| 3,938,016 A | * | 2/1976 | Lange et al. ............... 318/467 |
| 4,352,664 A | | 10/1982 | Morrison et al. |
| 4,494,051 A | | 1/1985 | Bailey |
| 4,524,313 A | | 6/1985 | Kuno |
| 4,608,527 A | | 8/1986 | Glennon et al. |
| 4,628,499 A | | 12/1986 | Hammett |
| 5,298,839 A | | 3/1994 | Takeda |
| 5,489,830 A | * | 2/1996 | Fernandez ............... 318/628 |
| 5,719,566 A | | 2/1998 | Readman |
| 5,821,660 A | | 10/1998 | Anderson |
| 5,868,359 A | | 2/1999 | Cartmell |

FOREIGN PATENT DOCUMENTS

| | | |
|---|---|---|
| EP | 0818387 A | 1/1998 |
| WO | WO0108971 A | 2/2001 |

* cited by examiner

Primary Examiner—Bentsu Ro (57) ABSTRACT

The present invention provides methods, systems, and apparati for fail passive error detection and control of a linear actuator recentering system. In an exemplary aspect of the present invention, linear actuator controls are designed to be fail passive. In one exemplary embodiment of the present invention, a recentering device is provided which receives a signal from an independent motion direction sensor and enables continuous monitoring of a recentering function, thereby detecting recentering control failures. In another exemplary embodiment, the present invention comprises a recentering motor control commutation device, an actuator movement direction sensor and an inverse commutation device for determining a centering polarity. The centering polarity is further provided to an aircraft control system which suitably provides continuous verification of the recentering commutation by comparison to linear actuator position determined by another sensor. In accordance with another exemplary embodiment, after detecting the failure of a control component, a brake is immediately set.

22 Claims, 5 Drawing Sheets

POSITION SENSOR AND ACTUATING SYSTEM

CROSS REFERENCE TO RELATED APPLICATION

This Application is related to U.S. patent application Ser. No. 09/896,218, filed Jun. 29, 2001 which is hereby incorporated by reference in its entirety.

BACKGROUND OF THE INVENTION

1. Technical Field

The present invention relates generally to the field of position sensors and actuating systems. More particularly, the present invention relates to a method and apparatus for detecting errors in an actuator recentering system and for providing a fail safe solution if an error is detected.

2. Background Art and Technical Problems

Figure 1:
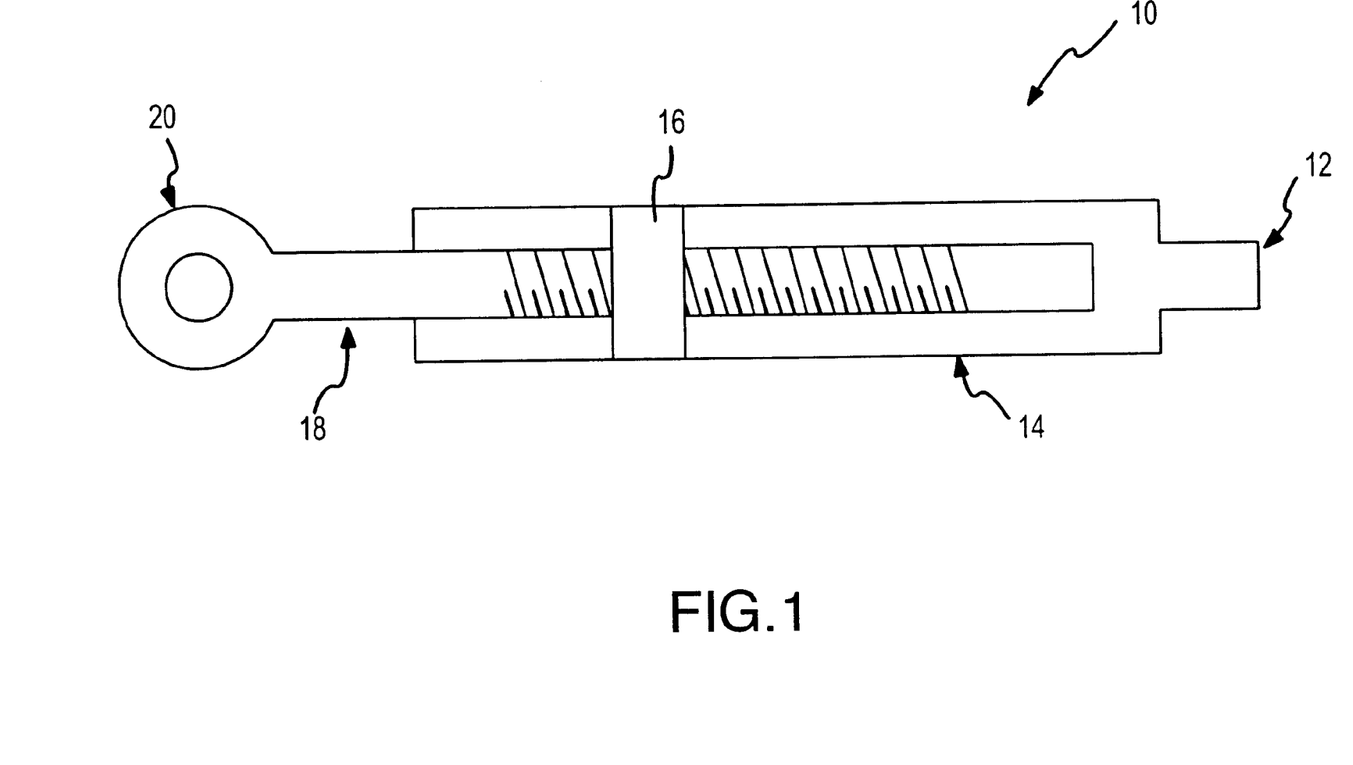
FIG. 1 is an exemplary embodiment of a linear actuator in accordance with one aspect of the present invention.

Various aircraft flight control systems have significantly improved safety, precision, and efficiency of travel. Many of these improvements are due in part to control systems that automate tasks that were previously performed by the vehicle operator. Such systems typically comprise a control unit which communicates with various servo units and actuators (such as linear actuators) which in turn control the actions of the aircraft (e.g., turn, roll, climb, etc.). For example, with reference to FIG. 1, a linear actuator 10 generally includes a motor input 12, an actuator casing 14, a nut 16 fixed to a casing 14 and a threaded actuator rod 18 mounted to a structure (e.g., a flap or an aircraft frame). Actuator rod 18 is also threaded to nut 16 and passes through actuator casing 14. Additionally, various actuators typically have mounting means on a portion of actuator rod 18 for attaching to and manipulating selected components such as landing gear, flaps, and other movable aircraft parts. For example, as illustrated in FIG. 1, actuator 18 has a connector 20 which is affixed to a moveable part of an aircraft. In operation, to manipulate the moveable part, a motor/servo unit provides commutation via motor input 12 to rotate casing 14. As casing 14 rotates, nut 16 which is affixed thereto also rotates with casing 14. The rotation of nut 16 causes actuator rod 18 to linearly extend or retract (depending on the direction of rotation), thus manipulating the control surfaces, for example, flaps and rudders, and other moving parts of the aircraft. Exemplary linear actuators include those associated with various autopilot systems used to control the aircraft during various stages of a flight plan. Linear actuators such as an SM-7000 linear actuator are available from Sagem.

Further, various types of motors are used to drive the linear actuator. For example, the motors used may contain Y or Delta windings, and the motors used may include brushed or brushless DC motors. Brush motors have several undesirable aspects. For example, brush motors are typically heavy, and the brushes eventually wear down due to the constant friction between the brush and commutator. Furthermore, the brush life and the reliability of the connection between the brush and commutator are dependent on environmental factors such as temperature, humidity, dust, and other contaminates. Therefore, brushless motors are now typical in the aviation industry.

The motors are often controlled by various autopilot and flight control systems which control the aircraft. However, given that controlling an aircraft generally calls for smooth control, it is often desirable that the control systems be fail passive. Stated otherwise, should the control systems or any components of the control systems fail, the aircraft's controls should not act in an undesirable or catastrophic manner (such as a sudden turn, roll or dive). For example, under various failure conditions, existing control systems have the potential to cause components, such as linear actuators, to fully drive the component in one direction or another. This is often referred to as a "runaway" condition.

A runaway condition might occur, for example, in a linear actuator recentering system. A linear actuator recentering system is generally designed to be momentarily accessed upon disengagement (either normal or abnormal disengagement) of the auto pilot system. The recentering system is momentarily accessed for the purpose of recentering the actuators to cause a smooth transition from auto pilot to manual control. Upon disengagement, the recentering system drives the actuators to a center position and then sets a brake on the actuator. However, if an error exists in the sensors that monitor the position of the actuator, or if some other error or failure in an actuator recentering component causes the recentering system to command the actuator away from center, it is possible that the centering system could fail and cause a runaway condition. Furthermore, the failure might only affect the actuator recentering function upon disengagement from the automation. It is therefore possible for a component to fail and for the aircraft to continue to fly for hours without any adverse consequences. Because the recentering system is not active during normal operation it is possible for this failure to remain latent (undetected) and manifest itself only upon disengagement. Upon disengagement, the aircraft may perform unpredictably if the actuator "runs away."

A runaway actuator could occur for example if a binary position indicator failed or if the control electronics failed. In this example, a signal might be sent indicating that the actuator was retracted from the neutral position when the actuator was actually extended from the neutral position. Unchecked, this signal can cause the recentering function to fully extend the actuator in the recentering function's attempt to return an extended actuator to a neutral position. In this situation, the actuator may be driven to full extension, i.e., drive the actuator "hard over". Furthermore, the actuator brake may not prevent the runaway condition because the actuator brake generally has a built in delay allowing the recentering.

Furthermore, other attempts to improve the reliability of the actuator recentering system generally focus on redundant systems. These redundant systems have two or more sensors as well as redundant control electronics. Solutions utilizing two of each component in the system are expensive, and in the aggregate add undesirable weight to the aircraft.

Accordingly, methods, apparatus and systems are therefore needed in order to overcome these and other limitations of the prior art. Specifically, there is a need for an independent motion direction sensor and associated logic enabling continuous monitoring of a recentering function, thereby guarding against failures of recentering controls, and thus improving the safety of auto pilot actuators and aircraft controls. Furthermore, a need exists for improved reliability recentering devices which do not require fully redundant equipment and systems.

SUMMARY OF THE INVENTION

The present invention provides methods, systems, and apparati for fail passive error detection and control of a linear actuator recentering system. In an exemplary aspect of the present invention, linear actuator controls are designed to be fail passive. In one exemplary embodiment of the present invention, a recentering device is provided which receives a signal from an independent motion direction sensor and enables continuous monitoring of a recentering function, thereby detecting recentering control failures. In another exemplary embodiment, the present invention comprises a recentering motor control commutation device, an actuator movement direction sensor and an inverse commutation device for determining a centering polarity. The centering polarity is further provided to an aircraft control system which suitably provides continuous verification of the recentering commutation by comparison to linear actuator position determined by another sensor. In accordance with another exemplary embodiment, after detecting the failure of a control component, a brake is immediately set.

BRIEF DESCRIPTION OF THE DRAWINGS

Additional aspects of the present invention will become evident upon reviewing the non-limiting embodiments described in the specification and the claims taken in conjunction with the accompanying figures, wherein like numerals designate like elements, and:

DETAILED DESCRIPTION OF EXEMPLARY EMBODIMENTS

The following descriptions are exemplary embodiments only, and are not intended to limit the scope, applicability, or configuration of the invention in any way. Rather, the following description provides a convenient illustration for implementing various embodiments of the invention. Various changes may be made in the function and arrangement of elements described in the illustrated embodiments without departing from the spirit and scope of the invention as set forth in the appended claims. In addition, while the following detailed description often refers to various functional block components and processing steps, it should be appreciated that such functional blocks may be realized by any number of hardware, firmware, and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. Such general techniques and components that are known to those skilled in the art are not described in detail herein. Similarly, while the present invention is described herein in conjunction with aircraft, other vehicles may be substituted, such as automobiles, and still fall within the ambit of the appended claims. In addition, in an exemplary embodiment, the present invention provides fail passive control for other moveable control systems such as rotary actuators.

In accordance with various aspects of the present invention, methods, systems and devices are provided for creating a fail passive system. For example, in one aspect of the present invention, an aircraft flight control system is configured to fail passively. As another example, in accordance with one aspect of the present invention, an error in a recentering system for a linear actuator can be detected. In accordance with a further aspect of the present invention, in the event an error is detected in a component of the recentering system, a brake is set on the linear actuator. Thus, in accordance with various aspects of the present invention, runaway of actuators in failure situations is prevented. Furthermore, in accordance with various aspects of the present invention, integrity of linear actuator controls is enhanced by a linear actuator fail passive control method.

That being said, the fail passive method in accordance with various aspects of the present invention includes a method or combination of steps which monitor the direction an actuator is moving, derive a centering polarity signal, compare this centering polarity signal with a directly determined actuator position, and, in the event of a discrepancy between the centering polarity signal and the directly determined actuator position, cause the linear actuator to fail passively. In an exemplary process in accordance with the present invention, and with reference to FIG. 2, the movement direction of an actuator is independently monitored in a step 100. In this embodiment, the actuator is a linear actuator 10 and the movement direction being monitored is the rotational movement of actuator casing 14 (i.e., clockwise or counter-clockwise). Furthermore, the monitoring of step 100 involves reporting this direction of rotation to a processor via a signal. It will also be appreciated that other steps for independently monitoring the movement of an actuator may be utilized in the present invention. For example, the movement direction being monitored may be the linear extension/retraction movement of actuator rod 18. This information can be interpreted to derive the direction of rotation, or vice versa.

Figure 2:
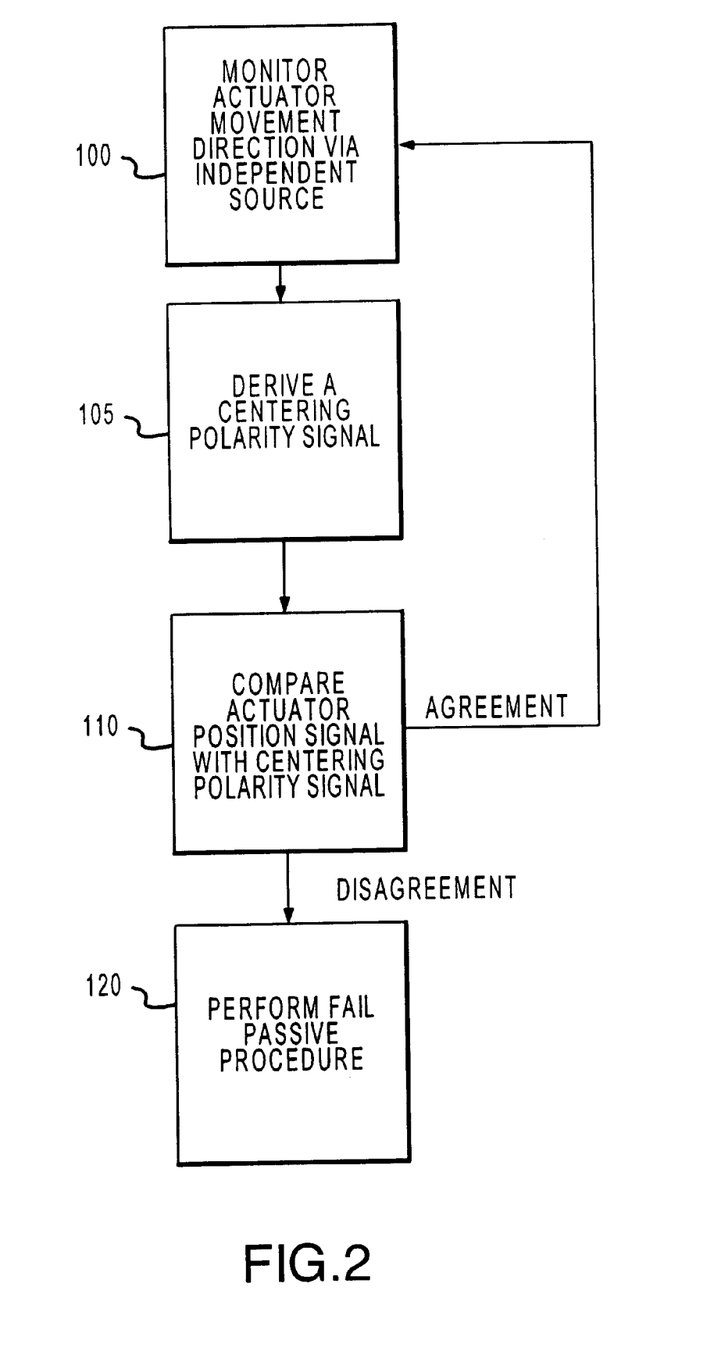
FIG. 2 is an exemplary embodiment of a method for providing a fail passive linear actuator control system, in accordance with one aspect of the present invention.

The step 100 monitoring of the movement direction of the linear actuator 10 is a measurement independent of measurements made by other sensors. For example, other sensors may be used to generally monitor and provide feedback regarding the actuator motor position. Furthermore, a separate sensor is used to directly sense the position of the linear actuator and report this information to the avionics. The direct sensing of the position of the linear actuator, which may also take place in step 100, provides a second indication of the position of the linear actuator.

In a step 105 of an exemplary embodiment, the independently monitored direction of movement of linear actuator 10 is used to derive a centering polarity signal. The centering polarity signal of step 105 is, in an exemplary embodiment, a binary signal indicating the relative position of the actuator relative to some neutral point. For example, the center polarity signal might indicate a logical zero if the actuator is retracted from the neutral point and a logical one if the actuator is extended from the neutral point. However, other representations of the actuator position may be used, and such representations may comprise various signal forms apart from binary signals.

Furthermore, in step 110, the centering polarity signal is compared with the position sensed by the direct actuator position sensor. If the centering polarity signal and the direct actuator position signal are in agreement, then this comparison verifies that the sensors and the controls of the actuator recentering system are operating properly. In an exemplary embodiment, comparison of the centering polarity signal and the direct actuator position signal is performed, for example, via aircraft control system software and involves periodic (e.g., approximately 20 times per second) comparison of the centering polarity signal and position signal. Furthermore, the software may allow for momentary disagreement of the position and centering polarity signals as the actuator position moves through neutral. The software may also allow for momentary disagreements that may occur due to tolerance and timing errors.

In accordance with various alternative embodiments, the monitoring and comparing process of step 110 is continuously repeated if the centering polarity signal and position signal are in agreement. In other embodiments, the monitoring and comparing process is intermittent. On the other hand, if the centering polarity signal and position signal are in disagreement, control is then pass to a step 120 where a fail passive procedure is implemented.

In accordance with the present invention, the fail passive procedure of step 120 comprises causing the actuator to fail in a non-extreme manner. For example, it may be safer to fix the flaps of an aircraft in their current position if a failure in the recentering control system is detected. Thus, in one exemplary embodiment, the fail passive procedure comprises the step of commanding the actuator to fail in a passive manner by setting the brake on the linear actuator to prevent a run away actuator condition. The step of setting the brake is also known as "neutralizing the fault". Other fail passive procedures are also contemplated within the scope of the present invention, such as disabling the recentering driver upon fault detection.

In a further aspect of the fail passive procedure of step 120, the fail passive procedure is implemented immediately upon error detection, and the pilot is alerted that an error occurred. Therefore, an exemplary fail passive recentering system automatically identifies faults, neutralizes (brakes) the fault, and alerts the pilot to the reduced system capability. In a further embodiment, the pilot alert indications are, for example, high level messages intended to identify what systems have degraded but not intended to aid in troubleshooting faults in flight.

In an exemplary embodiment, under normal flying conditions, a normal mode controller drives the motor of actuator 10. Upon disengagement of the automation, for any reason, control switches from the normal mode controller to a recentering controller. The driver for the normal controller is disabled and the driver for the recentering controller is momentarily enabled. In one exemplary embodiment the recentering controller comprises a hardware routine that attempts to recenter the actuator. After a predetermined period of time, the recentering controller is again disabled and a brake is applied to the actuator to prohibit further movement of the actuator. As one example, the predetermined period of time is one second.

If an error in the recentering control system occurs during a flight, this error generally would not manifest itself or cause any problems while the automation is engaged. The error might go undetected for a large portion of a flight because the recentering control system is generally not used until the auto pilot is disengaged. However, by detecting the error when it occurs and setting a brake on the actuator, as discussed in the above method, the latent error is reduced from approximately one flight to approximately one second.

In a further exemplary embodiment, the neutral position of actuator 10 is a center position, though it should be appreciated that other positions may likewise be set as the "neutral" position. It should also be appreciated that other combinations of these and similar steps may serve to monitor the direction of movement of a linear actuator, compare a derived centering polarity signal with a directly measured actuator position signal, and in the event a disagreement is detected in the signals, cause the linear actuator to fail passively.

As mentioned above, a mechanism, combination of mechanisms, or system of devices that performs the steps of the recentering system fail passive method may be utilized in the various embodiments of the present invention. For example, in a non-limiting embodiment of the present invention, and with reference to FIG. 3A, a fail passive actuator recentering device 200 comprises various sensors and control devices to perform the steps described above. In an exemplary embodiment, a control device 230 is configured in communication with motor position sensor 252, linear actuator movement direction sensor 254 and aircraft control system 240. Aircraft control system 240 is also configured in communication with a direct linear actuator position sensor 256 and a brake 280. Control device 230 provides control signals 220 to motor 212 which drives linear actuator 210.

Figure 3A:
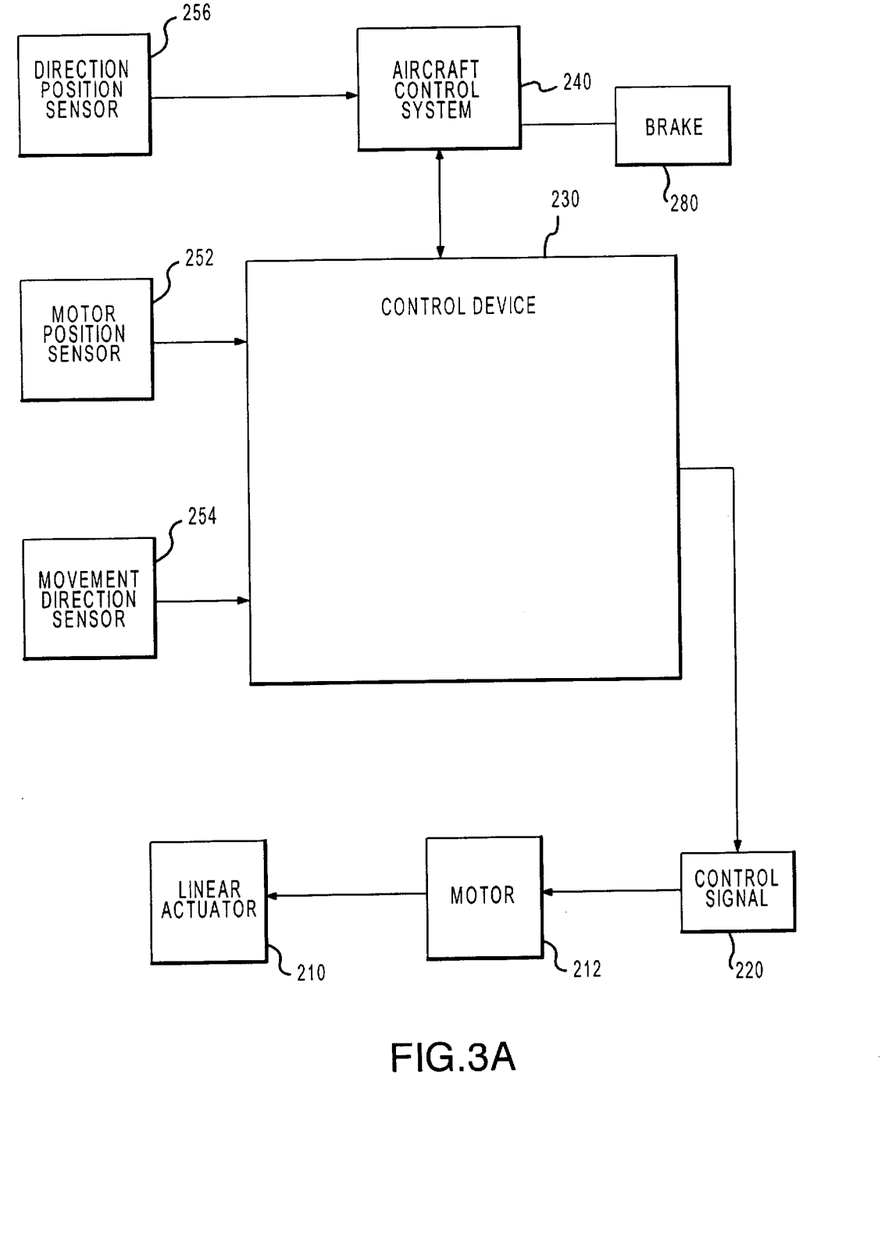
FIG. 3A is an exemplary embodiment of a linear actuator control system, in accordance with one aspect of the present invention.

For example, in this embodiment, the step 100 of monitoring actuator movement direction is implemented by a movement direction sensor 254 monitoring the direction of movement of actuator rod 18 within actuator case 14 (i.e., retract or extend). Equivalently, movement direction sensor 254 may measure the direction of rotation of case 14 around actuator rod 18 (i.e., clockwise or counter-clockwise). Sensor 254, communicates the monitored movement direction to control device 230, for example, in the form of an electronic or optic signal. Movement direction sensor 254, in one exemplary embodiment, comprises a single extend-retract Hall effect sensor. In this embodiment, the extend-retract Hall effect sensor is located in the middle of the actuator; however, the sensor could be located at the nut, or at other convenient locations. Furthermore, in other embodiments, instead of sensing the direction of movement of the actuator itself, the sensor could be located so as to sense the direction of movement of the flaps or other objects being moved by the actuator.

The single extend-retract Hall effect sensor creates, for example, a single bit signal with a logic one or logic zero representing the direction of movement of actuator 210. For example, a logic zero represents that the actuator is extending, and a logic one represents that the actuator is retracting. The opposite logic is also provided in another exemplary embodiment. It should be appreciated, however, that other types of and numbers of sensors and signal formats which serve to monitor and transmit the movement of the actuator may also be utilized to perform the function of movement direction sensor 254.

In accordance with another exemplary embodiment of the present invention, the aircraft control system 240 also receives an actuator position signal from a direct position sensor 256. Direct position sensor 256 is, for example, a linear variable differential transformer (LVDT). LVDT 256 is internal to the actuator with one end connected to the actuator base and the other connected to the output shaft, thereby measuring position. The LVDT is configured in communication with aircraft control system 240. Other direct position sensors may also be used to provide a signal to aircraft control system 240 indicative of the position of the linear actuator.

In accordance with yet another exemplary embodiment, the step 105 of deriving a center polarity signal is implemented via control device 230. Control device 230 comprises, for example, hardware and software logic and is configured to receive motor position signals from sensor 252 and actuator movement direction signals from sensor 254. Control device 230 is further configured to compute and provide a centering polarity feedback signal to aircraft control system 240 and to compute and provide control signals 220 to motor 212 for controlling the movement of linear actuator 210.

In accordance with an exemplary embodiment, the step 110 of comparing the centering polarity signal with the directly measured actuator position is executed in aircraft control system 240 which is configured with a control device, a logic device or a processor suitable for comparing values. In an exemplary embodiment, aircraft control system 240 ascertains whether the recentering system has an error that could cause a runaway condition. Aircraft control system 240 determines the existance of an error by comparing the position of the actuator from direct position sensor 256 with the centering polarity signal. It should be understood, however, that other devices which function to compare the two recentering direction determinations may be utilized in an exemplary embodiment of the present invention.

A disagreement between these two signals indicates an error is present in the recentering system. For example, the position sensor may indicate that the linear actuator is retracted from the neutral position and the centering polarity signal may indicate that the linear actuator is extended from the neutral position thus giving rise to a disagreement between the signals and indicating a possible error in the recentering system.

In a further exemplary embodiment, aircraft control system 240 performs the step 120 of causing the linear actuator recentering system to fail passively by commanding fail passive actions. For example, control unit 230 provides signals to set a brake on actuator rod 18 preventing further movement of the actuator rod 18.

In a further exemplary embodiment, under normal operation, the position of actuator rod 18 is controlled via motor drive signals 220 sent to motor 212 from control unit 230. These motor drive signals 220 cause motor 212 to turn motor input 12 and extend or retract actuator rod 18 as commanded by either the auto-pilot or the recentering function.

Figure 3B:
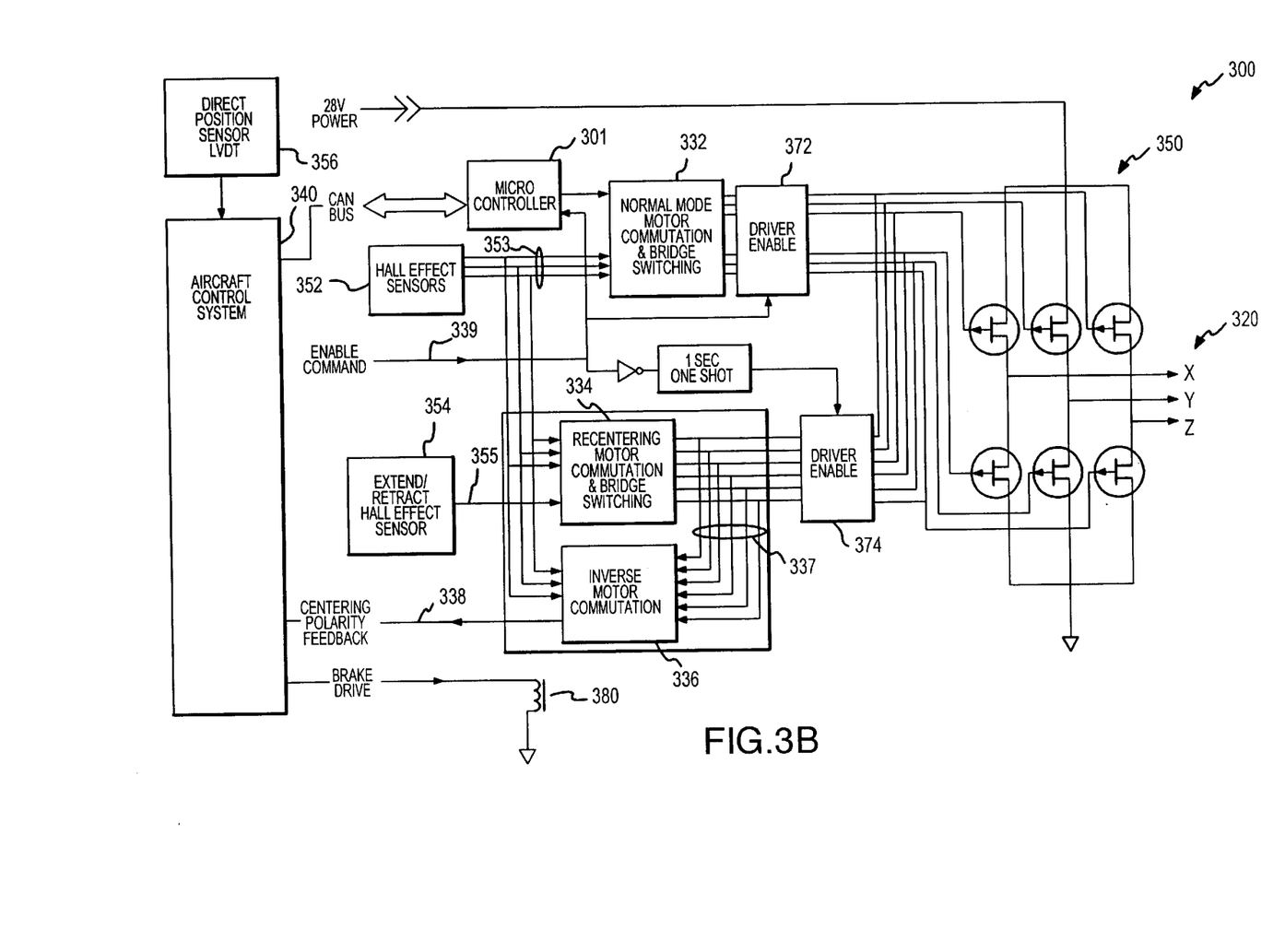
FIG. 3B is an exemplary embodiment of linear actuator electronics, in accordance with one aspect of the present invention.

In an exemplary embodiment, with reference to FIG. 3B, a normal mode motor commutation & bridge switching ("MCBS") 332 is configured to receive and process control signals from a microcontroller 301 and motor feedback position signals 353 from motor position sensors 352. Also, a recentering motor commutation & bridge switching ("MCBS") 334 is configured to receive and process actuator movement direction signals from both motor position sensors 352 and movement direction sensor 354. Field Effect Transistors ("FET") 350 are switches that provide voltage to the motor windings. In an exemplary embodiment, one of the high side FET's and one of the other low side FET's are on at any on time. This allows the amplifier to control motor current in both directions of each winding pair. FET's 350 are configured to be driven by at most one of MCBS 332 or 334 as permitted by driver enable blocks 372 and 374.

Inverse motor commutation 336 is configured to receive MCBS 334 recentering control signals 337 as well as Hall effect sensor 352 signals 353 and to output a centering polarity signal 338 to aircraft control system 340. Aircraft control system 340 also is configured to receive linear actuator position signals from direct position sensor 356, to communicate with brake 380, and to communicate with micro controller 301. System and independent MCBS devices 332 and 334 as well as inverse motor commutation device 336 may, for example, be programmable logic devices ("PAD"), such as 16 pin PLD's.

In an exemplary embodiment, under non-failure operating conditions and during "automatic pilot" mode, an aircraft control system 340 provides commands via a CAN bus to a microcontroller 301 directing the movement of an actuator. Microcontroller 301 in turn commands a normal operating mode MCBS 332 to move the actuator. In this embodiment, an enable command, for example, logic high, on line 339 enables the normal mode MCBS to drive the field effect transistors 350 which in turn energizes selected signal lines 320 (e.g., X, Y, and Z) to the linear actuator drive motor and causes the motor to turn the linear actuator in the direction indicated by the automation. In this exemplary embodiment, Hall effect sensors 352 provide feedback on motor position to normal mode MCBS 332. For example, microcontroller 301 receives instructions from the automation to adjust an actuator to lower flaps. Microcontroller 301 then commands system MCBS 332 to cause this action to be performed. System MCBS 332 can signal pull up/pull down FET switches 350 to cause XYZ signals 320 to be sent which drive the motor and extend (or retract) the actuator rod.

Upon disengagement of the automation, a hardware recentering process is initiated. Aircraft control system 340 switches from normal MCBS control to recentering MCBS by sending a logic low signal on enable line 339 which disables normal mode driver 372 and momentarily enables recentering driver 374. The normal mode driver 372 and recentering driver 374 are configured, in this exemplary embodiment, such that the same signal on enable line 339 will only allow one controller at a time to control the linear actuator motor.

Recentering MCBS 334 provides hardware recentering logic which continuously receives signals from motor position Hall effect sensors 352 and extend-retract hall effect sensor 354 and computes recentering control signals 337 to drive the actuator to a neutral position. Once recentering driver 374 is enabled, those command signals drive FET's 350 which drive the linear actuator motor. In one exemplary embodiment, the simple hardware of MCBS 334 causes the actuator to drive just past the neutral position and to correct and go back and forth about the neutral position. This occurs for a short period of time, for example, one second. After that short period of time, a "one shot" device again disables driver 374. In addition, aircraft control system 340 may cause a brake 380 to be set on the actuator to hold the actuator in this position.

That being said, if during the normal operation of the automatic pilot routine, an error is detected that would cause the actuator to go "hard over", the recentering system fail passive method described above may be implemented. In an exemplary embodiment, the step 100 of monitoring the motion direction of the actuator is implemented by a movement direction sensor which, for example, comprises a single extend-retract Hall effect sensor 354 for sending a single bit signal 355 to a recentering MCBS device 334. In one exemplary embodiment, motion direction signal 355 indicates which direction the actuator casing is turning (i.e., clockwise or counter clockwise). In another exemplary embodiment, signal 355 indicates whether the actuator rod is extending or retracting. Furthermore, avionics 340 receives a signal from direct position sensor which is, in one exemplary embodiment, a linear variable differential transformer (LVDT) 356.

The step 105 of deriving a center polarity signal is implemented by recentering MCBS device 334 and inverse motor commutation device 336. Recentering MCBS continuously receives feedback motor position signals 353 as well as actuator motion direction signal 355. The motor position and the direction of rotation are then processed to calculate recentering control signals 337 directing the servo drive states which turn on individual FET's which turn on voltage to the motor windings and cause the motor to drive the actuator towards a neutral position. The recentering control signals 337 are then processed by the inverse motor commutation device 336 to provide, for example, to avionics Motor Commutation State Table which defines the six driver output states 337 for all possible input states of Hall effect sensor ("HES") and command polarity. Similarly, Table 2 represents an Inverse Motor Commutation State Table which defines the recentering polarity state 338 for all possible input states of HES's and FET drivers. In other embodiments, MCBS device 334 and inverse motor commutation device 336 are implemented through other logic devices or programming.

TABLE 1

Motor Commutation State Table

| Motor Position | HES A | HES B | HES C | Command Polarity | FET 28v-X | FET 28v-Y | FET 28v-Z | FET GND-X | FET GND-Y | FET GND-Z |
|---|---|---|---|---|---|---|---|---|---|---|
| 0–30 | 1 | 1 | 0 | CW | ON | OFF | OFF | OFF | OFF | ON |
| 30–60 | 1 | 0 | 0 | CW | ON | OFF | OFF | OFF | ON | OFF |
| 60–90 | 1 | 0 | 1 | CW | OFF | OFF | ON | OFF | ON | OFF |
| 90–120 | 0 | 0 | 1 | CW | OFF | OFF | ON | ON | OFF | OFF |
| 120–150 | 0 | 1 | 1 | CW | OFF | ON | OFF | ON | OFF | OFF |
| 150–180 | 0 | 1 | 0 | CW | OFF | ON | OFF | OFF | OFF | ON |
| 0–30 | 1 | 1 | 0 | CCW | OFF | OFF | ON | ON | OFF | OFF |
| 30–60 | 1 | 0 | 0 | CCW | OFF | ON | OFF | ON | OFF | OFF |
| 60–90 | 1 | 0 | 1 | CCW | OFF | ON | OFF | OFF | OFF | ON |
| 90–120 | 0 | 0 | 1 | CCW | ON | OFF | OFF | OFF | OFF | ON |
| 120–150 | 0 | 1 | 1 | CCW | ON | OFF | OFF | OFF | ON | OFF |
| 150–180 | 0 | 1 | 0 | CCW | OFF | OFF | ON | OFF | ON | OFF |
| Invalid HES State | 0 | 0 | 0 | X | OFF | OFF | OFF | OFF | OFF | OFF |
| Invalid HES State | 1 | 1 | 1 | X | OFF | OFF | OFF | OFF | OFF | OFF |

TABLE 2

Inverse Motor Commutation State Table

| Motor Position Range | HES A | HES B | HES C | FET 28v-X | FET 28v-Y | FET 28v-Z | FET GND-X | FET GND-Y | FET GND-Z | Recentering Polarity Feedback |
|---|---|---|---|---|---|---|---|---|---|---|
| 0–30 | 1 | 1 | 0 | ON | OFF | OFF | OFF | OFF | ON | Extend |
| 30–60 | 1 | 0 | 0 | ON | OFF | OFF | OFF | ON | OFF | Extend |
| 60–90 | 1 | 0 | 1 | OFF | OFF | ON | OFF | ON | OFF | Extend |
| 90–120 | 0 | 0 | 1 | OFF | OFF | ON | ON | OFF | OFF | Extend |
| 120–150 | 0 | 1 | 1 | OFF | ON | OFF | ON | OFF | OFF | Extend |
| 150–180 | 0 | 1 | 0 | OFF | ON | OFF | OFF | OFF | ON | Extend |
| 0–30 | 1 | 1 | 0 | OFF | OFF | ON | ON | OFF | OFF | Retract |
| 30–60 | 1 | 0 | 0 | OFF | ON | OFF | ON | OFF | OFF | Retract |
| 60–90 | 1 | 0 | 1 | OFF | ON | OFF | OFF | OFF | ON | Retract |
| 90–120 | 0 | 0 | 1 | ON | OFF | OFF | OFF | OFF | ON | Retract |
| 120–150 | 0 | 1 | 1 | ON | OFF | OFF | OFF | ON | OFF | Retract |
| 150–180 | 0 | 1 | 0 | OFF | OFF | ON | OFF | ON | OFF | Retract |
| Invalid State | 0 | 0 | 0 | X | X | X | X | X | X | Invalid |
| Invalid State | 1 | 1 | 1 | X | X | X | X | X | X | Invalid |
| All Other Combinations | X | X | X | X | X | X | X | X | X | Invalid |

240, a centering polarity feedback signal 338. Inverse motor commutation device 336 suitably provides continuous verification of the recentering commutation in the form of a center polarity output. The centering polarity feedback signal 338 tells the avionics of polarity, i.e., whether the actuator is extended or retracted from the neutral position.

In one exemplary embodiment of the present invention, the processing functions of MCBS device 334 and inverse motor commutation device 336 are implemented as state tables in a PLD. The inputs to the PLD are compared with the state table and an output in the state table corresponding to the input is provided. For example, Table 1 represents a Motor position sensor 352 comprises, for example, 3 Hall effect sensors 352 for sending signals 353 to system MCBS device 332. These Hall effect sensors indicate the position of the motor are used as feedback for control of the linear actuator motor. The three Hall effect sensors 352 are located on the motor in a radial fashion at equal (120 degree) intervals. The Hall effect sensors 352 produce the A, B, C signals shown in FIG. 4, where each falling edge is 120 degrees to the right of the previous signal. These signals provide motor rotational alignment relative to the motor windings to allow either the normal controller 332 or the recentering controller 334 to commutate (rotate) the electrically induced magnetic field to torque the motor.

Centering polarity feedback signal 338 is compared with the directly measured actuator position, in step 110, by using a logic device within aircraft control system 340. The advantage to this arrangement is that it detects faults in extend-retract Hall effect sensor 354 but it also allows monitoring of recentering commutation device 334. For example, a failure within the recentering commutation device 334 which affected a properly working extend-retract Hall effect sensor 354 would be detected by this monitor. In other words, fail passive actuator recentering device 300 provides complete monitoring capability of the entire recentering function, sensors and electronics. The step 120 is implemented when aircraft control system 340 compares the centering polarity signal 338 with the LVDT signal from sensor 356. If there is disagreement between the two signals, the flight control computer locks brake 380 immediately preventing the recentering function from causing a runaway condition.

Figure 4:
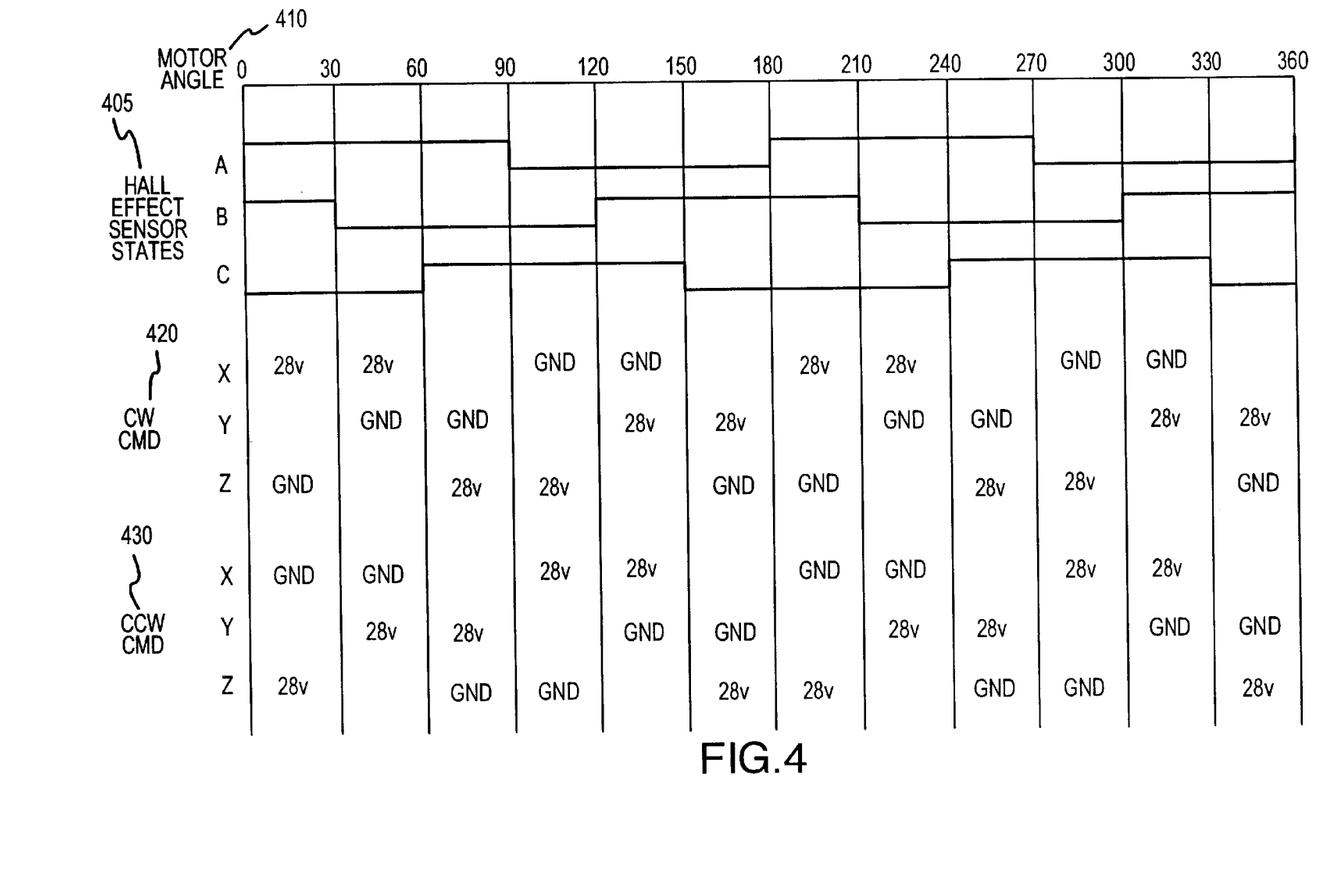
FIG. 4 is an exemplary embodiment of brushless motor commutation logic, in accordance with one aspect of the present invention.

With regard to FIG. 4, a brushless motor commutation logic diagram is provided showing an exemplary Hall effect sensor signal pattern 405 representative of driving an exemplary motor. To cause the motor to turn in a specified direction (i.e. clockwise 420 or counter clockwise 430), the pattern of FIG. 4 can be interpreted to determine the voltage to be placed on signal lines 320 given the current motor position (motor angle) 410. For example, by knowing the direction of movement of the actuator (i.e., clockwise or counter clockwise) and the current motor position, motor control signals 337 can be computed to cause the motor to turn in the direction which will cause the linear actuator to move towards the center. This logic is used, in an exemplary embodiment, by MCBS 332 and 334 to drive the linear actuator motor under normal conditions. Thus, motor control signals 337 continuously indicate which direction the linear actuator must be driven to recenter the linear actuator.

Furthermore, the recentering motor control signals 337 and the current motor position signals may be interpreted by the inverse motor commutation device to determine which direction 420 or 430 would recenter the linear actuator, and based on this information generate the centering polarity feedback signal. Stated otherwise, by knowing the current position of the motor, the recentering command signals, and the pattern associated with control of the motor, it is possible to determine which direction the actuator is being commanded to move for recentering. Thus it is possible to determine whether the actuator is extended or retracted from the neutral position.

In various exemplary embodiments, the pattern associated with control of the motor may vary as the type of motor varies, or with different design changes. Nevertheless, formulas, look up tables, and other methods may be used whereby the motor commutation and bridge switching devices and inverse motor commutation device may interpret signals and determine or compute output signals as describe herein.

In exemplary embodiments, the actuator motor comprises a brushed or brushless motor. In accordance with one aspect of the present invention, fully redundant systems are not required to provide full time monitoring of the recentering electronics. Thus, a fail passive method and devices in accordance with the present invention provide a high integrity actuator recentering control system resulting in improved vehicle performance and safety. Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims. For example, the present method may also be used to monitor non-linear movement. Furthermore, devices identified herein may comprise individual devices for performing the function of a single device.

We claim:

1. A method for providing fail passive protection for an actuator recentering system comprising the steps of:

determining a direction of motion of an actuator;

deriving a centering polarity signal based on the direction of motion of the actuator;

comparing the centering polarity signal with an actuator position signal; and commanding the actuator to fail in a passive manner when the centering polarity signal is in disagreement with the actuator position signal.

2. The method of claim 1, the actuator being a linear actuator.

3. The method of claim 2, the actuator position signal being generated by a linear variable differential transformer.

4. The method of claim 2, the direction of motion being determined by an extend-retract Hall effect sensor.

5. The method of claim 2, the comparing step further comprising the step of receiving the centering polarity signal and the actuator position signal at an aircraft control system.

6. The method of claim 1, the commanding step further comprising the step of setting a brake.

7. The method of claim 4, the deriving step further comprising the steps of:

computing at least one recentering control signal based on the extend-retract Hall effect sensor signal, at least one motor feedback position signal, and a look up table; and computing the center polarity signal based on the at least one recentering control signal, at least one motor feedback position signal, and a look up table.

8. The method of claim 7, wherein the deriving step is implemented using a program logic device.

9. The method of claim 8, the comparing step further comprising the step of receiving the centering polarity signal and the actuator position signal at an aircraft control system.

10. A fail passive linear actuator controller configured to perform the method of claim 7.

11. An aircraft flight control system for providing high integrity linear actuator recentering with fail passive control, the system comprising:

an aircraft control system configured to receive a linear actuator position signal representative of a position of the linear actuator, the aircraft control system further configured to receive a centering polarity signal representative of a relative position of the linear actuator, the aircraft control system further configured to compare the linear actuator position signal to the centering polarity signal, and the aircraft control system further configured to cause a brake to be set if the linear actuator position signal disagrees with the centering polarity signal; and a control unit configured to communicate with a motor position sensor, a linear actuator motion direction sensor, and the aircraft control system, the control unit further configured to drive the linear actuator motor, and wherein the control unit is configured to derive a centering polarity signal.

12. The system of claim 11, the motor configured to be a brushless motor.

13. The system of claim 11, wherein the communication from the motor position signal is at least one signal representative of a motor angle.

14. The system of claim 13, wherein the communication from the movement direction sensor is representative of a direction of rotation of the linear actuator.

15. The system of claim 14, the control unit further comprising an inverse motor commutation device configured to generate the centering polarity signal based on the motor angle and at least one recentering control signals.

16. The system of claim 15, the control unit further comprising a normal mode motor commutation and bridge switching device, and a recentering motor commutation and bridge switching device.

17. The system of claim 16, the inverse motor commutation device configured to receive signals from the motor position sensor and the recentering motor commutation and bridge switching device, and wherein the inverse motor commutation device is configured to provide a centering polarity feedback signal.

18. A fail passive control apparatus configured to cause a linear actuator to fail passively, the fail passive control apparatus comprising:

a recentering motor commutation device configured to receive a movement direction signal from a movement direction sensor and a motor position signal from a motor position sensor, wherein the recentering motor commutation device is configured to continuously generate a recentering control signal, and wherein the recentering control signal is calculated to return the linear actuator to a neutral position when a failure is detected;

an inverse motor commutation device, the inverse motor commutation device configured to receive the recentering control signal and motor position signal, and configured to provide a centering polarity signal indicating the relative position of the linear actuator to the neutral position, and wherein the centering polarity signal is based on the recentering control signal and motor position signal; and an aircraft control system in communication with the inverse motor commutation device, wherein the aircraft control system is configured to determine if an error exists by comparing the centering polarity signal and a direct linear actuator position signal, and wherein the aircraft control system is configured to set a brake if an error is detected.

19. The control apparatus of claim 18, the movement direction sensor further comprising an extend-retract Hall effect sensor.

20. The control apparatus of claim 18, a direct linear actuator sensor configured to provide the direct linear actuator position signal; wherein the direct liner actuator sensor is a linear variable differential transformer.

21. The control apparatus of claim 18, wherein the neutral position is a center position.

22. The control apparatus of claim 18, wherein the inverse motor commutation device comprises a program logic device.

* * * * *